United States Patent
Palma et al.

(10) Patent No.: US 6,273,395 B1
(45) Date of Patent: Aug. 14, 2001

(54) ELECTRONICALLY ACTUATED SUCTION CONTROL VALVE ASSEMBLY

(75) Inventors: Rodolfo Palma, Canton; Atul Natverial Sheth, Novi; Andre D. Jess, Dearborn Hgts., all of MI (US)

(73) Assignee: Ford Global Tech., Dearborn, MI (US)

( * ) Notice: Subject to any disclaimer, the term of this patent is extended or adjusted under 35 U.S.C. 154(b) by 0 days.

(21) Appl. No.: 09/415,843

(22) Filed: Oct. 12, 1999

(51) Int. Cl.⁷ .................................................. F16K 31/10
(52) U.S. Cl. ......................................................... 251/129.21
(58) Field of Search ......................................... 251/129.21

(56) References Cited

U.S. PATENT DOCUMENTS

| | | | |
|---|---|---|---|
| 3,312,445 | * 4/1967 | Trombatore et al. | 251/129.21 X |
| 4,557,670 | 12/1985 | Inagaki et al. . | |
| 4,750,704 | 6/1988 | Brunage . | |
| 5,135,027 | 8/1992 | Miki et al. . | |
| 5,318,208 | * 6/1994 | Van Der Wal | 251/129.21 X |
| 5,529,387 | * 6/1996 | Mialkowski | 251/129.21 X |
| 5,533,707 | * 7/1996 | Beesley | 251/129.21 X |
| 5,562,426 | 10/1996 | Watanabe et al. . | |
| 5,607,288 | 3/1997 | Wallis et al. . | |
| 5,713,726 | 2/1998 | Nakayoshi . | |
| 5,921,281 | * 7/1999 | Takayama et al. | 251/129.21 X |

* cited by examiner

*Primary Examiner*—Kevin Shaver
*Assistant Examiner*—Eric Keasel
(74) *Attorney, Agent, or Firm*—Ford Global Tech.

(57) ABSTRACT

A valve assembly 10 for use in a compressor. Valve assembly 10 includes a generally cylindrical stator member or assembly 12 and an inner valve or member 14 which is slidably engaged within stator assembly 12. Stator assembly 12 includes a conventional electrically operated coil 20 which is coupled to a conventional controller 98. Controller 98 selectively connects and disconnects coil 20 to and from a conventional battery 96, thereby allowing coil 20 to selectively receive electrical power. When coil 20 receives electrical power, a movable member 68 within member 14 is actuated, thereby creating a communication passage between a relatively high pressure chamber 84 and a relatively low pressure chamber 88.

13 Claims, 3 Drawing Sheets

ELECTRONICALLY ACTUATED SUCTION CONTROL VALVE ASSEMBLY

FIELD OF THE INVENTION

This invention relates to a valve assembly and more particularly, to a suction control valve assembly which is selectively and electrically actuated.

BACKGROUND OF THE INVENTION

Valve assemblies are used within automotive vehicles and other apparatuses to control the flow of fluids, gasses, and other materials between various interconnected and/or communicating portions or chambers which are respectively contained and/or resident within these apparatuses.

One type of valve assembly, known as a suction control valve assembly, is typically placed within an air conditioning assembly and more particularly, within the refrigerant compressor of an air conditioning assembly of a vehicle, and operatively controls the flow of refrigerant fluid, gas, and/or vapor within the compressor.

This type of valve assembly typically includes a "mechanical type" actuator which selectively causes the valve to actuatably move between an "open" position and a "closed" position. The selective actuation of the valve assembly communicatively transfers and/or moves refrigerant fluid, gas, and/or vapor from a relatively high pressure environment or chamber to a relatively low pressure environment or chamber within the compressor, thereby substantially equalizing the pressure differential between the contained chambers.

This type of valve assembly typically includes a "bellows" valve which is selectively actuated or operatively moved between an "open" and a "closed" position, by changes in the pressure differential existing between opposed sides or portions of the valve and/or between the operatively interconnected chambers or pressure environments (e.g., the valve is "opened" by the pressure differential when the pressure differential exceeds a "predetermined value" and is "closed" by the pressure differential when the pressure differential is equal to or less than a predetermined value). While this valve assembly is relatively effective to operatively and communicatively transfer fluid, gas, and/or vapor by and between portions or chambers of the compressor, and to substantially equalize the pressure between these operatively interconnected portions or chambers, it suffers from some drawbacks which adversely effect the performance and efficiency of the compressor in which it is employed.

For example and without limitation, since this prior type of valve assembly is adapted to actuate only when a single predetermined pressure differential value exists between the operatively interconnected chambers or environments, it often causes the compressor to "run" or operate at higher than desirable rates or "capacities".

Particularly, it is often desirable to actuate the valve assembly at one or more pressure differentials which are less than this single "predetermined value" (e.g., when a lesser degree of cooling is desired). By selectively actuating the valve assembly at lesser pressure differentials, the compressor is allowed to operate at a much lower capacity, thereby conserving power and improving overall operating efficiency. Allowing a compressor to operate at a lower or reduced capacity further substantially decreases the frequency at which the electromagnetic "clutch" of the compressor, which allows the vehicle engine to operatively drive the compressor, is engaged and/or is "cycled".

Because the above-described prior type of valve assembly is not designed and/or adapted to be selectively actuatable at multiple and/or at relatively "low" pressure differential values, the compressor must often operate at capacities which are undesirably high, thereby undesirably reducing the operating efficiency of the compressor. The inability of the prior valve assembly to actuate at multiple and/or relatively "low" pressure differentials further causes unnecessary cycling of the electromagnetic clutch which causes relatively significant "loads" to be applied to the vehicle's engine, thereby adversely effecting the performance and speed of the engine and the vehicle. Moreover, since the prior valve assembly does not have a mechanism to actually move or actuate the valve, separate and apart from and/or independent of the pressure differential, the use of multiple actuating pressures is not practical.

There is therefore a need for an improved valve assembly for use in a compressor, which may be selectively actuated at multiple pressure differentials; which substantially improves the overall operating efficiency of the compressor; which allows the compressor to operate at various operating capacities; and which substantially reduces the cycling frequency of the compressor's electromagnetic clutch.

SUMMARY OF THE INVENTION

It is a first object of the invention to provide a valve assembly which overcomes some or all of the previously delineated drawbacks of prior valve assemblies.

It is a second object of the invention to provide a valve assembly which can be selectively and electronically actuated at various pressure differentials.

It is a third object of the present invention to provide a valve assembly which is adapted to be used within a compressor and which improves the overall operating efficiency of the compressor.

It is a fourth object of the present invention to provide a valve assembly which may be used in combination with a compressor, which allows the compressor to operatively function at various operating capacities, and which may be selectively actuated by a mechanism which functions independent of the pressure differential.

According to a first aspect of the present invention, a valve assembly for use in combination with a first chamber, a second chamber, and a source of electrical power is provided. The valve assembly includes a first member having a coil, and a channel which is communicatively connected to the first chamber and to the second chamber. A switch is coupled to the coil and to the source of electrical power, and selectively connects the coil to the source of electrical power. A second member is disposed within the channel and is movable between a first position in which the first chamber and the second chamber do not communicate and a second position in which the first chamber communicates with the second chamber. The second member is movable from the first position to the second position when the coil is connected to the source of electrical power, and allows the first chamber and the second chamber to be selectively and communicatively connected when the coil is energized.

According to a second aspect of the present invention, a method of controlling the flow of a material between a first chamber and a second chamber is provided. The method includes the steps of: providing a first member; communicatively coupling the first member to the first and second chambers; providing a second member; disposing the second member within the first member between the first chamber and the second chamber; disposing a coil within the first member; disposing a magnetic member within the second member, the magnetic member being movable from a first position in which the material is substantially prevented from flowing between the first and the second chamber and a second position in which the material is permitted to flow between the first and the second chamber; and selectively energizing the coil effective to cause the magnetic member to move from the first position to the second position.

These and other objects, aspects, features, and advantages of the present invention will become apparent from a consideration of the following specification and the attached drawings.

DETAILED DESCRIPTION OF THE PREFERRED EMBODIMENT

Figure 1:
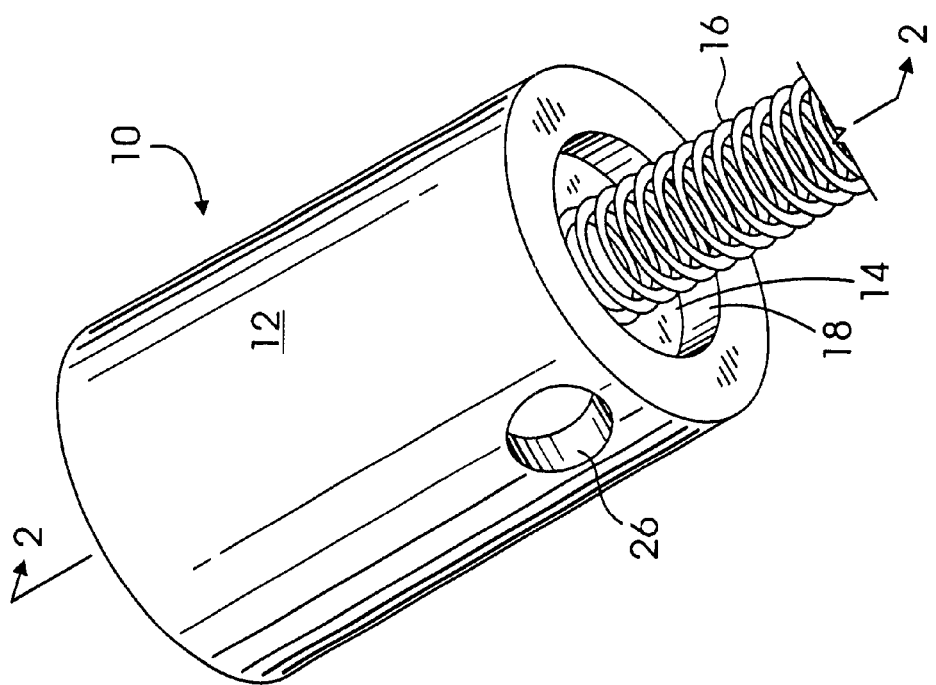
FIG. 1 is a perspective view of a valve assembly which is made in accordance with the teachings of the preferred embodiment of the invention.
Figure 2:
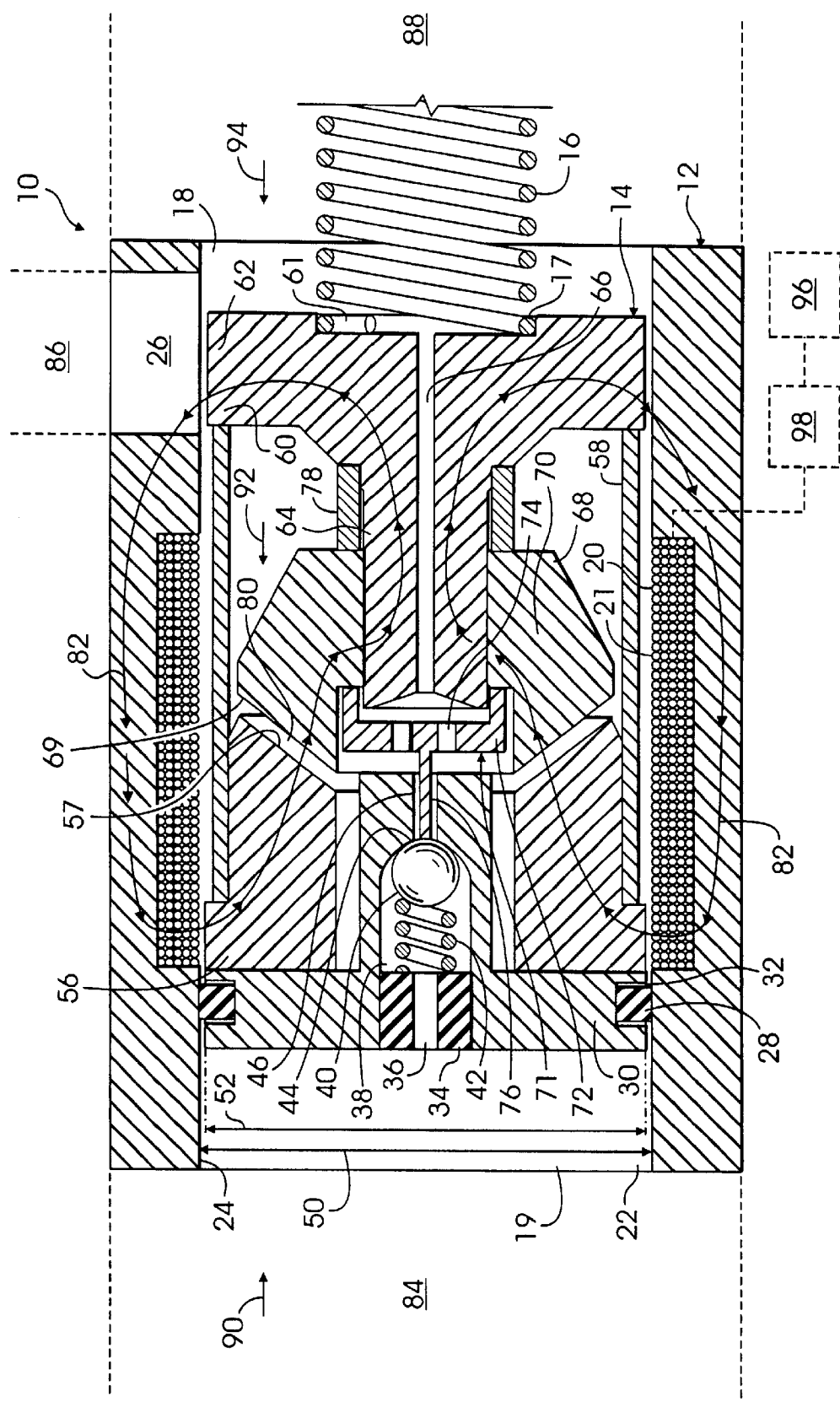
FIG. 2 is a sectional view of the valve assembly which is shown in FIG. 1 and which is taken along view line 2—2.
Figure 3:
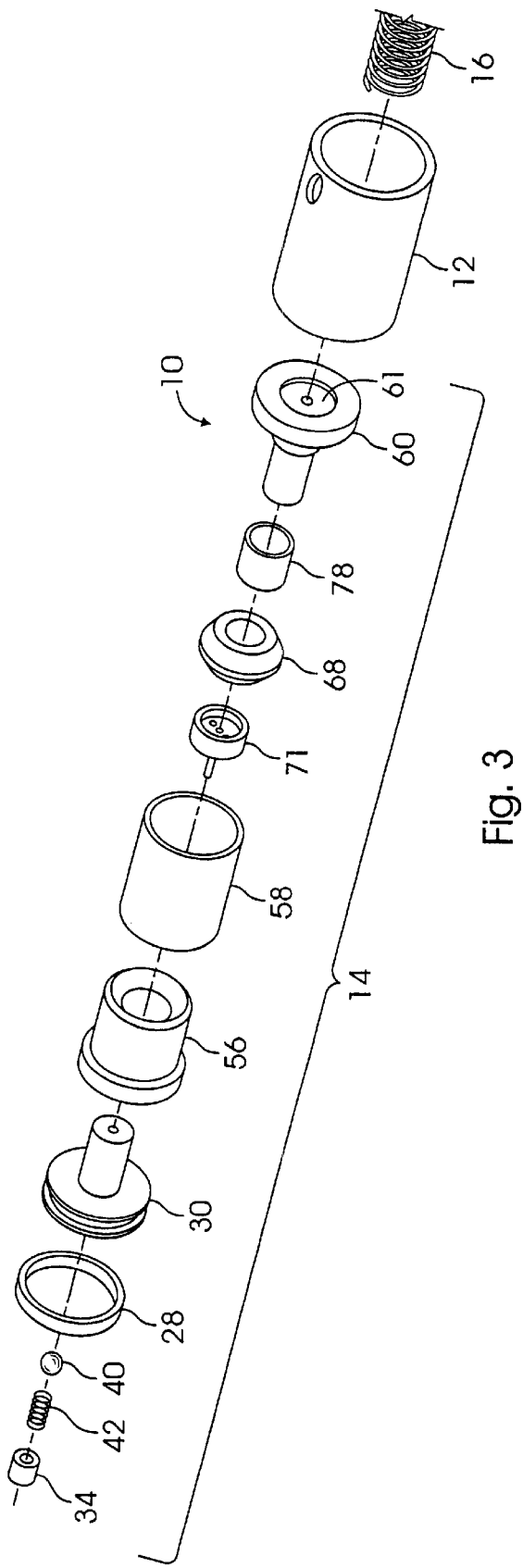
FIG. 3 is a perspective and unassembled view of the valve assembly which is shown in FIG. 1.

Referring now to FIGS. 1–3, there is shown a valve assembly 10 which is made in accordance with the teachings of the preferred embodiment of the invention. As shown, valve assembly 10 includes a generally cylindrical stator member or stator assembly 12 and an inner valve member or assembly 14 which is selectively, cooperatively, and slidably disposed within the stator member or assembly 12. Assembly 10 further includes a conventional spring 16 which extends through aperture 18 of stator assembly 12 and which is received by and is conventionally and operatively coupled to member 14. It should be appreciated by one of ordinary skill in the art that valve assembly 10 may be used to replace a conventional valve assembly 10, such as an assembly used within a conventional scroll-type compressor, and as described more fully and completely below, is designed and/or adapted to be positioned and/or operatively and communicatively connected to a relatively high pressure environment or chamber 84, an intermediate pressure environment or chamber 86, and a relatively low pressure environment or chamber 88.

Intermediate pressure chamber 86 in one non-limiting embodiment, has a pressure which is higher than the pressure of chamber 88 but lower than the pressure of chamber 84.

Stator assembly 12 is preferably manufactured from a magnetic material such as without limitation a soft iron alloy. Stator assembly 12 further includes a generally cylindrical and centrally disposed channel 22 having a relatively smooth inner surface 24, an integrally formed and generally circular intermediate pressure intake aperture, passage, or port 26 which communicates with chamber 88, and a conventional electrical coil 20 which is "wound around" a generally cylindrical bobbin 21. Bobbin 21 and channel 22 have substantially identical diameters 50. Channel 22 includes a second generally circular aperture 19. Particularly, apertures 18, 19 respectively and communicatively connect channel 22 to relatively low pressure environment or chamber 88 and relatively high pressure environment or chamber 84.

Coil 20 is physically, electrically, and communicatively coupled to a conventional switch, switching device, or controller 98, which selectively and operatively connects and disconnects coil 20 to and from a conventional battery 96, thereby allowing coil 20 to selectively receive electrical power.

Member 14 slidably and frictionally engages surface 24 and is axially movable within channel 22 between a first position in which member 14 fully covers or seals port 26, thereby substantially preventing communication from occurring between chambers 86 and 88, and a second position in which port 26 is fully "opened" or uncovered and is in communication with environment 88. It should be appreciated that member 14 may further occupy other intermediate positions between the first and the second position in which port 26 is partially covered or "opened" (e.g., the position illustrated in FIG. 2).

Member 14 is generally cylindrical in shape and has a diameter 52 which is substantially identical to the diameters 50 and of channel 22 and bobbin 21. Member 14 further includes a communication portion or section 30 which operatively resides within chamber 84, and which includes a generally circular seal or ring 28 which is disposed in an annular groove 32 that is integrally formed within the periphery of section 30. Ring 28 sealingly and slidably mates with surface 24 of channel 22. Section 30 further includes a centrally disposed slot 38. A plug 34, having a centrally disposed passage or aperture 36, is fixedly secured within slot 38. Also disposed within slot 38 is a conventional spring 42 which is operatively coupled to plug 34 and to a generally spherical sealing ball member 40. Spring 42 pressingly forces ball member 40 against an indentation or "valve seat" 44 which is integrally formed within section 30, thereby operatively sealing communication aperture or orifice 46.

Member 14 further includes a magnetic pole portion 56 which is fixedly attached to section 30 and is preferably manufactured from a magnetic material which is substantially identical to the material of stator assembly 12. A substantially cylindrical, substantially non-magnetic, and protective cover or casing 58 is fixedly attached to portion 56 and to a second magnetic pole portion 60. Pole portion 60 includes a generally circular base 62 and a generally cylindrical projection 64 which perpendicularly extends from base 62. Base 62 and projection 64 each cooperatively form and/or include a centrally disposed and generally cylindrical passage or channel 66. Base 62 includes a generally circular recessed portion 61 within which end 17 of spring 16 is conventionally coupled or secured.

A movable "cap" or member 68 is slidably engaged with projection 64. Member 68 includes a magnetized body portion 70 which engages with and slides upon projection 64 and a ball engagement assembly 71 which is fixedly coupled to body 70. When member 68 is "at rest" (e.g., when coil 20 is not activated or energized), member 68 abuts a "spacer element" or ring 78 which is fixedly secured to projection 64 and abuts base 62. Ball engagement assembly 71 includes a generally circular base portion 72 having two substantially identical apertures or passages 74 which operatively communicate with channel 66, and a push pin 76, which selectively and operatively engages ball 40. An air gap 80 is formed and exists between surface 69 of member 68 and surface 57 of pole portion 56, when member 68 is in its "at rest" position (e.g., when coil 20 is not activated or energized).

In operation, valve assembly 10 is selectively and operatively disposed or secured within a device having various portions or chambers which are desired to be pressurably regulated (e.g. the pressure within the various portions or chambers is to be regulated), such as within a conventional scroll compressor. Particularly, in one nonlimiting embodiment aperture 19 of stator 12 is operatively and communicatively coupled to a relatively high pressure chamber or environment 84, port 26 is operatively and communicatively coupled to an intermediate pressure chamber or environment 86, and aperture 18 is operatively and communicatively coupled to a relatively low pressure or "discharge" chamber or environment 88. In such a manner, it should be appreciated that, assembly 10 may be used to selectively replace a conventional mechanical or "bellows" type valve assembly within an existing compressor (e.g. a scroll type compressor), thereby selectively "retrofitting" the compressor. Spring 16 is operatively coupled to a fixed wall or member (not shown) within chamber or environment 88. Assembly 10 is connected to the compressor or device in a manner which permits "communication" or the passage of fluid, gas, and/or vapor between chambers 84, 86, and 88 to occur through assembly 10.

As the pressure of fluid and/or vapor within chamber 84 increases and exceeds the pressure within chamber 88, member 14 is forced in the direction illustrated by arrow 90. This pressure-generated force causes member 14 to move axially in the direction of arrow 90, thereby compressing spring 16. Seal 28 substantially prevents the flow of any fluid, gas, and/or vapor between chamber 84 and chambers 86 and/or 88. After a predetermined time interval has expired, after a predetermined temperatures has been sensed within the vehicle, or after a predetermined value of pressure has been sensed within chamber 84 (e.g., sensed by way of one or more conventional pressure sensors), controller 98 physically and electrically couples coil 20 to battery 96, thereby activating or energizing coil 20. The activation of coil 20 generates a magnetic field which cooperates with the magnetic material of stator 12, pole portion 56, movable cap 70 and pole portion 62 to create a magnetic "loop" or "B"-field 82. It should be realized that the magnetic field 82 may be selectively generated by controller 98 at any desired time and in response to any sensed pressure differential. As described below, the magnetic field represents an actuating mechanism which is separate and/or independent from the pressure differential, and which causes assembly 10 to equalize the pressure differential between chamber 84 and 88.

Field 82 respectively and temporarily magnetizes pole portion 56 causing surface 69 of cap 68 and surface 57 of pole 56 to share opposite magnetic "charges". This imparts an electromagnetic force upon pole 56 and cap 68, which attracts cap 68 and pole 56 toward each other. In response to this attractive force, cap 68 slidably moves upon portion 64 toward pole portion 56 in the direction illustrated by arrow 92.

As cap 68 moves along portion 64, push pin 76 forces ball 40 out of seat 44, thereby operatively "opening" communication orifice 46. Once orifice 46 is opened, a "path" or passage between high pressure chamber 84 and low pressure environment 88 is created, thereby causing the relatively high pressure fluid, gas, and/or vapor resident within chamber 84 to flow into the relatively low pressure chamber or chamber 88. Particularly, the relatively high pressure fluid, gas, and/or vapor travels through aperture 36, slot 38, orifice 46, apertures 74, and channel 66, and into relatively low pressure environment or discharge chamber 88. As fluid, gas, and/or vapor travels between chamber 84 and chamber 88, the relative pressure differential between the two chambers 84, 88 becomes substantially equalized.

As the pressure differential between chambers 84 and 88 is substantially equalized, the force generated by the pressure differential in the direction illustrated by arrow 90 becomes less than the compression force provided by spring 16 in the direction illustrated by arrow 94. As a result, spring 16 forces member 14 to slidably move within channel 22 in the direction of arrow 94, thereby opening port 26 and allowing communication between chamber 86 and chambers 84 and 88.

After a predetermined and/or desirable amount of pressure equalization has occurred (e.g., after a certain amount of time has elapsed, after a predetermined temperature has been sensed, or after a certain pressure or pressure differential value is conventionally sensed by controller 98), controller 98 selectively disconnects coil 20 from battery 96, thereby discharging and/or deactivating coil 20. After coil 20 is no longer energized or charged, the magnetic field 82 is dispersed, thereby substantially eliminating the attractive electromagnetic force between cap 68 and pole portion 56. Once this attractive electromagnetic force is substantially eliminated, spring 42 forces ball 40 back into seat 44 thereby effectively sealing communications orifice 46 and forcing cap 68 to slidably move along portion 64 to its original or "non-actuated" position.

It should be appreciated that by allowing valve assembly 10 to be electrically actuated by an external controller 98, assembly 10 may be actuated at various, different, and/or relatively lesser pressure differentials than prior mechanical or bellows-type valve assemblies (e.g., when a lesser degree of cooling is desired). Furthermore, since valve assembly 10 is actuated by a mechanism which is separate from and/or independent of the pressure differential existing by and between chambers 84, 86, and 88 (e.g. by the selectively generated magnetic field 82) actuating assembly 10 at multiple pressure differentials values is easily accomplished. By selectively and remotely actuating valve assembly 10 at various and/or lesser pressure differentials, the compressor is allowed to operate at a significantly lower capacity, thereby conserving power and improving the efficiency of the compressor. Furthermore, allowing the compressor to operate at a lower or reduced capacity substantially decreases the frequency at which the electromagnetic "clutch" of the compressor is engaged and/or is "cycled".

It is understood that the invention is not limited by the exact construction or method illustrated and described above but that various changes and/or modifications may be made without departing from the spirit and/or the scope of Applicants' inventions.

What is claimed is:

1. A valve assembly for use in combination with a first chamber, a second chamber, and a source of electrical power, said valve assembly comprising:

a first member having a coil and a channel which is communicatively connected to said first chamber and to said second chamber and which includes an inner surface;

a switch which is coupled to said coil and to said source of electrical power and which selectively connects said coil to said source of electrical power; and a second member which is disposed within said channel and which includes a first portion having a seal which sealingly engages said inner surface of said channel, a centrally disposed first passage which communicates with said first chamber and which includes an integrally formed valve seat, and a spring and a sealing ball member which are disposed within said first passage, said spring being effective to cause said ball member to selectively engage said valve seat, thereby sealing said first passage, and a second portion having an integrally formed second passage which selectively communicates with said second chamber and said first passage, and a magnetic member which includes a push pin which engages said ball member, said magnetic member being selectively movable between a first position in which said ball member resides within said valve seat, thereby substantially preventing communication between said first chamber and said second chamber and a second position in which said push pin forces said ball member out of said seat, thereby communicatively coupling said first passage and said second passage, effective to allow said first chamber to communicate with said second chamber, said magnetic member being movable from said first position to said second position when said coil is connected to said source of electrical power, thereby allowing said first chamber and said second chamber to be selectively and communicatively connected in response to said connection of said coil to said source of electrical power.

2. The valve assembly of claim 1 wherein said first chamber contains material having a first pressure and wherein said second chamber contains material having a second and higher pressure.

3. The valve assembly of claim 1 wherein said second portion comprises a generally circular base and a generally cylindrical projection which extends from said base, and which contains said integrally formed second passage, and wherein said magnetic member is slidably disposed upon said generally cylindrical projection.

4. The valve assembly of claim 1 wherein said second member is slidably disposed within said channel.

5. The valve assembly of claim 4 further comprising a second spring which is connected to said second member.

6. The valve assembly of claim 1 wherein said first and second chambers are contained within a scroll type compressor.

7. The valve assembly of claim 1 further comprising a controller for selectively operating said switch.

8. A method of controlling the flow of a material between a first chamber and a second chamber, said method comprising the steps of:

providing a first member;

communicatively coupling said first member to said first and second chambers;

providing a second member;

disposing said second member within said first member between said first chamber and said second chamber;

disposing a seal around said second member effective to prevent the flow of material around said second member;

disposing a coil within said first member;

forming a first passage and a valve seat within said second member, said first passage communicating with said first chamber;

providing a spring and a ball member;

disposing said spring and said ball member within said first passage, said spring being effective to force said ball member against said valve seat, thereby sealing said first passage;

forming a second passage within said second member, said second passage selectively communicating with said second chamber and said first passage;

disposing a magnetic member within said second member, said magnetic member including a push pin which engages said ball member, said magnetic member being movable from a first position in which said ball member resides within said valve seat, thereby substantially preventing the flow of material between said first chamber and said second chamber and a second position in which said push pin forces said ball member out of said valve seat, effective to communicatively couple said first and second passages, thereby allowing material to flow between said first chamber and said second chamber; and selectively energizing said coil effective to cause said magnetic member to move from said first position to said second position.

9. The method of claim 8 wherein said first member is generally cylindrical.

10. The method of claim 8 further comprising the steps of:

providing a controller for selectively energizing said coil.

11. The method of claim 8 wherein said first chamber and said second chamber are chambers contained within a scroll compressor.

12. The method of claim 8 wherein said second member is movable within said first member.

13. The method of claim 8 wherein said first chamber contains a first portion of said material at a first pressure, said second chamber contains a second portion of said material at a second pressure, and wherein said coil is selectively energized independent of the difference between said first pressure and said second pressure.

* * * * *